Aug. 4, 1964 P. L. RICHMAN 3,143,708
R.M.S. TO D.C. SIGNAL CONVERTER
Filed Oct. 22, 1959 2 Sheets-Sheet 1

INVENTOR.
PETER L. RICHMAN
BY
Joseph Weingarten
ATTORNEY

INVENTOR.
PETER L. RICHMAN
BY
Joseph Weingarten
ATTORNEY

United States Patent Office 3,143,708 Patented Aug. 4, 1964

3,143,708

R.M.S. TO D.C. SIGNAL CONVERTER

Peter L. Richman, Boston, Mass., assignor to Epsco, Incorporated, Cambridge, Mass., a corporation of Massachusetts Filed Oct. 22, 1959, Ser. No. 847,946
8 Claims. (Cl. 328—26)

This invention relates in general to signal conversion apparatus and more particularly pertains to a narrow band electronic device for converting the root mean square (R.M.S.) value of an input waveform to a direct current (D.C.) signal.

The invention is intended to measure with precision, either the fundamental value or the R.M.S. value of an input waveform that is reasonably constant in frequency, though the waveform may contain up to ten percent of harmonic distortion. The invention employs active elements arranged to constitute an operational filter of high precision, the filter functioning to extract the fundamental waveform from a composite input waveform. The extracted fundamental waveform is then applied to a converter along with a correction signal which is a function of the residual harmonic content of the input waveform. The converter is of the type which converts an input waveform to a direct current proportional to the average value of the input. The correction signal acts as a correction factor in the converter to cause the fundamental average determination to be converted into an R.M.S. determination.

There are four basic amplitude parameters of any essentially sinusoidal waveform:

(*a*) Peak or peak to peak (*b*) Absolute average (half or full wave)

(*c*) Root mean square (*d*) Fundamental, i.e., a pure sine wave (since peak, absolute average, and R.M.S. are all related by simple scale factors for a pure sine wave, any one can be measured here). Of the four basic amplitude parameters, peak is generally the least meaningful in view of extreme sensitivity to variations in harmonic content and to noise; the latter, while it may contain only a negligible amount of energy, can materially influence the output of a peak reading device.

In contrast to a peak determination, determination by a measuring device of the absolute average value of an essentially sinusoidal waveform is less subject both to variations in harmonic content and to line noise. Since performance of such a device is based on the absolute average of the input wave form taken over a fundamental cycle, it is the average of the line noise rather than peak noise amplitude that determines the noise error. Similarly, it is the average (taken over a fundamental cycle) rather than the peak value of the harmonic content that determines the error due to harmonics. If, for example, 6% third harmonic distortion is present (by amplitude ratio or R.M.S. radio) in the input wave form, two out of every three cycles of the third harmonic that occur cancel one another out in any average determination over a fundamental cycle so that the remaining contribution to error is only the third cycle. As a result, error in the average determination in the above example would be only one-third of 6%, or 2%. Effective reduction in error contribution due to harmonic content for higher harmonics is proportional to the order of the harmonics. Five percent fifth harmonic will cause an error of only 1%; 22% eleventh harmonic will cause an error of only 2%, and so on. Still less sensitive to harmonic distortion is the root mean square (R.M.S.) value of an input wave form. Sensitivity of R.M.S. determination to line noise, as a practical matter, is less than or comparable with that of an average determination. As an example, for 5% (R.M.S.) harmonic distortion, the error introduced into the determination of the fundamental value of an input wave form is 0.125%. When an R.M.S. converter is employed and distortion is 2%, the error in fundamental determination is 0.02%. The last of the four amplitude parameters listed above is determination of fundamental. This computation involves complete independence from both harmonic variations and line noise. As a practical matter, determination of the fundamental has been difficult to accomplish with precision by conventional means. The invention described herein avoids the difficulties formerly attendant upon the determination of the fundamental.

The arrangement of the invention together with its mode of operation may be better apprehended by reference to the following detailed description when considered in conjunction with the accompanying drawings in which:

FIG. 1 is a schematic diagram of a simplified form of the invention;

FIG. 2 schematically depicts the manner in which the feedback of a high gain amplifier is utilized in accordance with the invention;

Figure 1:
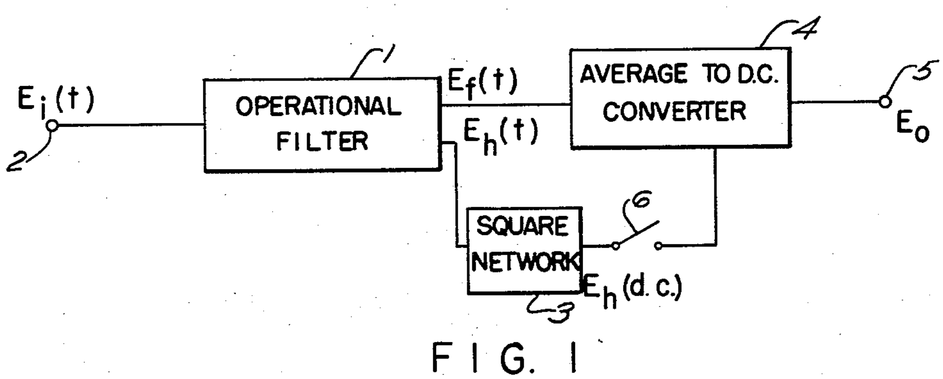
Figure 4:
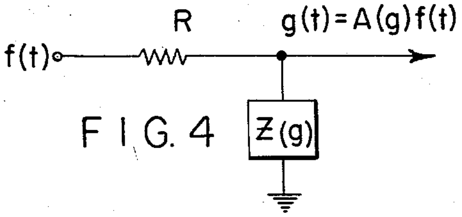
FIG. 4 represents a simplified squaring network.

Referring now to FIG. 1, which illustrates the invention by a simplified schematic block diagram, there is shown an operational filter 1 having impressed on its input terminal 2 an input voltage $E_i$ whose amplitude varies essentially sinusoidally in time. The operational filter provides two outputs; the primary output, denoted $E_f(t)$, is essentially a pure sine wave whose amplitude and frequency are identical with the amplitude and frequency of the input $E_i(t)$; the secondary output, denoted $E_h(t)$, is the residual harmonic content of the input wave form $E_i(t)$. The secondary output $E_h(t)$ is applied to a square network 3 and that network provides a small D.C. correction voltage $E_h$(D.C.), which is proportional to the square of the harmonic content $E_h(t)$ of the input $E_i(t)$. The small correction voltage $E_h$(D.C.) and the primary output $E_f(t)$ are applied to an Average to D.C. converter 4. A determination of the average value of the fundamental $E_f(t)$ is made in converter 4 and appropriately scale factored so that the D.C. output voltage $E_0$ obtained at terminal 5 is proportional to the R.M.S. value of $E_f(t)$. Where the R.M.S. value of the entire input $E_i(t)$ is required, the correction voltage $E_{h(D.C.)}$ is employed to correct for the harmonic content in the input. When only the fundamental content of the input $E_i(t)$ is required, the correctional voltage $E_{h(D.C.)}$ is not needed and may be decoupled from converter 4 by the switch 6. The arrangement described above is based on the concept that an input signal $E_i(t)$ composed of a predominant fundamental $E_f(t)$ with superimposed harmonics whose total is $E_h(t)$, has an R.M.S. value $E_{irms}$ differing from the R.M.S. value of the fundamental $E_{frms}$ by only a small fraction of $E_{frms}$. That fraction is $$\frac{E^2_{hrms}}{2E^2_{frms}}$$

so that where the fraction is small, i.e. <<1, the term can be either completely neglected or roughly compensated for, when determining the R.M.S. value of $E_i$ from a determination of the R.M.S. value of the fundamental $E_f$. In the arrangement of FIG. 1, the term $$\frac{E^2_{hrms}}{2E^2_{frm}}$$

is neglected by opening switch 6 and is compensated for by maintaining switch 6 closed.

Figure 2:
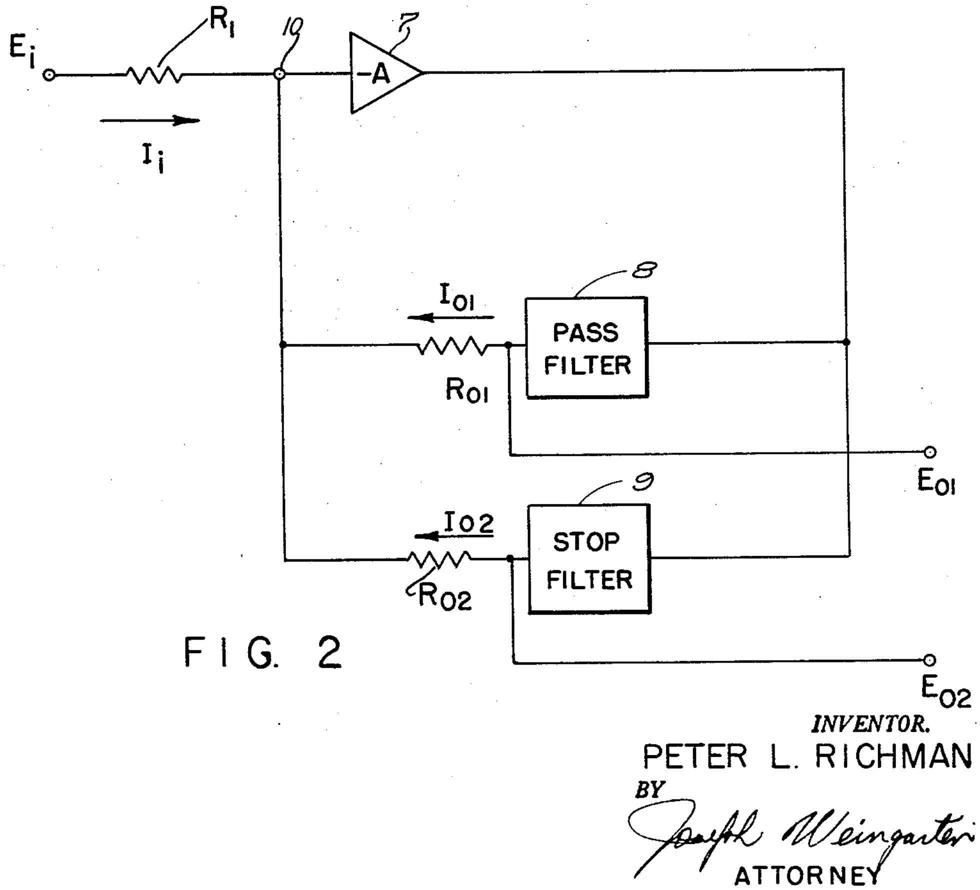

The purpose of the operational filter is to extract with high precision the fundamental component of a complex waveform, in order that this fundamental or the residual harmonic components or both may be operated upon to obtain a determination of the average value of the fundamental modified by some simple function of the residual harmonics. To achieve that purpose, the feedback of a wide band, high gain feedback amplifier is split into two parts as schematically depicted in FIG. 2. The input $E_i$, assumed to be a complex waveform, is impressed upon the wide band, high gain amplifier 7, that amplifier having two feedback paths, one feedback path having a bandpass characteristic centered about the frequency of the fundamental component, and the other feedback path having a band rejection characteristic also centered about the frequency of the fundamental component, the desired characteristics being obtained by including filters in each of the feedback paths. For example, the "pass" filter 8 may be a simple parallel-resonant circuit tuned to the fundamental and the "stop" filter 9 may be a series-resonant circuit also tuned to the fundamental. For equal values of the three resistors $R_i$, $R_{o1}$, and $R_{o2}$, the total of the two output voltages $E_{o1}$ and $E_{o2}$ must equal the input $E_i$, since the sum of the currents $I_i$, $I_{o1}$, and $I_{o2}$ at the summing junction 10 is substantially zero where the internal gain (−A) of the amplifier is sufficiently high.

Therefore $$I_i+I_{o1}+I_{o2}=0$$

or $$\frac{E_i}{R_i}+\frac{E_{o1}}{R_{o1}}+\frac{E_{o2}}{R_{o2}}=0$$

and since $$R_i=R_{o1}=R_{o2}$$

$$E_{o1}+E_{o2}=-E_i$$

Now at the fundamental frequency $\omega o$, let $$E_{o1}=K_{p(\omega o)}E_o(\omega o)$$

where $K_p$ is the attenuation characteristic of the pass mechanism $$E_{o2}=K_{s(\omega o)}E_o(\omega o)$$

where $K_s$ is the attenuation characteristic of the stop mechanism

While at the most predominant harmonic present in the input $E_i$, a frequency $E_i$, a frequency $n\omega_o$, let $$E_{o1}=K_{p(n\omega o)}E_o(n\omega o)$$

$$E_{o2}=K_{s(n\omega o)}E_o(n\omega o)$$

Then at the fundamental frequency $\omega o$ $$\frac{E_{o1}}{E_{o2}}=\frac{K_{p(\omega o)}}{K_{s(\omega o)}}$$

While at the predominant harmonic frequency $n\omega o$ $$\frac{E_{o1}}{E_{o2}}=\frac{K_{p(n\omega o)}}{K_{s(n\omega o)}}$$

Using typical values, if $K_{p(\omega o)}=1/2$ and $K_{s(\omega o)}=1/200$, then the ratio of the fundamental component in $E_{o1}$ to the fundamental component in $E_{o2}$ is 100 to 1, while at $n\omega o$, say the third harmonic, the ratio of the third harmonic component in $E_{o1}$, to the third harmonic component in $E_{o2}$ can typically be 1 to 30.

Figure 3:
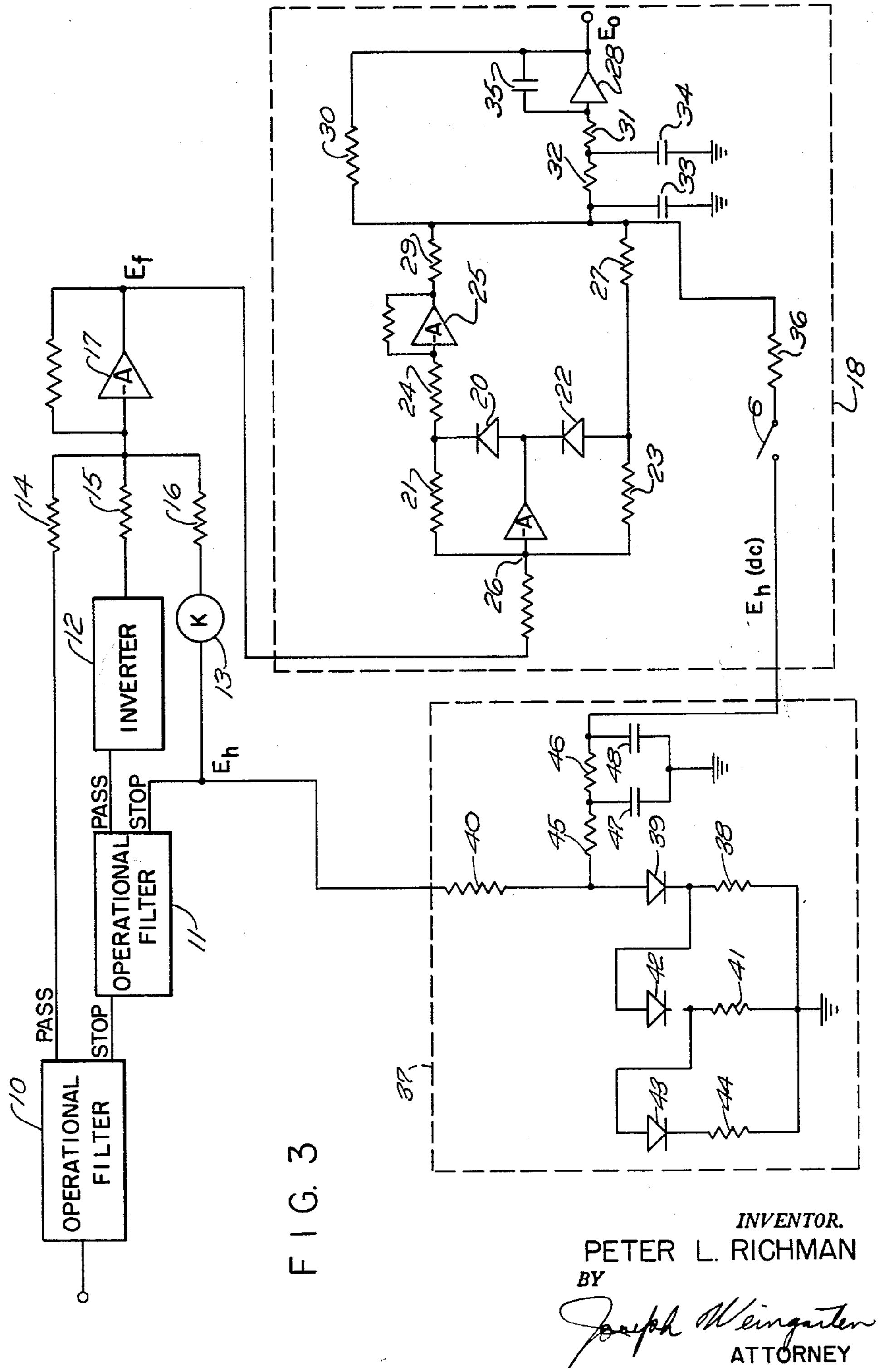
FIG. 3 illustrates in detail a preferred embodiment of the invention.

By employing two or more operational filters in cascade, the results obtained by operational filtering are greatly enhanced. Consider FIG. 3 showing an operational filter 10 having the output from its "stop" filter applied to a second operational filter 11. For an input voltage $E_i$ composed of a fundamental $E_f$ plus the sum $E_h$ of all harmonics, the operational filter of FIG. 2 may be taken to have two outputs:

$E_{o1}$ or the "pass" output $=-(1-\Delta_f)E_f-\Delta_hE_h$ $E_{o2}$ or the "stop" output $=-\Delta_fE_f-(1-\Delta_h)E_h$ where $\Delta_fE_f$ is the small amount of fundamental appearing at the stop output, $\Delta_f<<1$ $\Delta_hE_h$ is the small amount of harmonics appearing at the pass output, $\Delta_h<<1$ Since the "stop" output of filter 10 constitutes the input to operational filter 11, the outputs of the second filter are:

$$\text{"pass" output}=(1-\Delta_f)\Delta_fE_f+(1-\Delta_h)\Delta_hE_h$$

$$\text{"stop" output}=\Delta_f2E_f+(1-\Delta_h)^2E_h$$

By the addition of the "pass" output of filter 10 and the inverted "pass" output of filter 11, there would be obtained the sum S.

$$S=-(1-\Delta_f)E_f-\Delta_hE_h-(1-\Delta_f)\Delta_fE_f-(1-\Delta_h)\Delta_hE_h$$

$$S=-E_f-2\Delta_hE_h+\Delta_f^2E_f+\Delta_h^2E_h$$

If the "stop" output of the filter 11 is multiplied by a factor K, where $K<<1$, and the resultant is also added to S to obtain $S^1$, then:

$$S^1=-E_f-2\Delta_hE_h+\Delta_f^2E_f+\Delta_h^2E_h+K\Delta_f^2E_f+KE_h-2KE_h\Delta_h+K\Delta_h^2E_h$$

Eliminating $K\Delta_f^2E_f$, $K\Delta_h^2E_h$ and $2K\Delta_hE_h$ as insignificant in comparison with $KE_h$ which itself is small, and setting $K=2\Delta_h$, then $$S^1\approx-E_f+\Delta_f^2E_f+\Delta_h^2E_h$$

which, for $\Delta_f<<1$ and $\Delta_h<<1$ reduces to $S^1\approx E_f$ to a very high order of precision.

The system of FIG. 3, includes a mechanism 12 for inverting the "pass" output of filter 11, and a multiplier 13 for modifying the "stop" output of that filter by a factor K in accordance with the foregoing mathematical analysis. The "pass" output of operational filter 10, the output of inverter 12, and the output of multiplier 13 are algebraically added in accordance with equation (1), to obtain $S^1$. The summing operation is performed in FIG. 3 by the resistors 14, 15, and 16, which comprise a summing network, and the operational amplifier 17. Since the operational amplifier characteristically has unity gain and inverts the polarity of the input signal at its output, the output of amplifier 17 is almost precisely equal to $E_f$. In particular, the deviation of that output from the input $E_f$ can be as low as .01 or .02% for inputs of reasonable harmonic content and for filters of high, yet practical Q. Even higher precision may be obtained, by arranging additional operational filters in the cascade.

The Average to D.C. converter 4 of FIG. 1 is represented in FIG. 3 by the circuitry contained within the block 18. The converter is designed to employ only high gain operational amplifiers and passive elements, i.e., resistors, as the components which determine system accuracy. The sinusoidal voltage $E_f$ from amplifier 17 is utilized as the input to the operational amplifier 19 which has two feed back paths; one through the diode 20 and resistor 21; the other through diode 22 and resistor 23. During the positive half cycle of $E_f$, diode 20 conducts, causing feedback current to flow through resistor 21 and causing a half-cycle waveform to appear across resistor 24, the input resistor of operational amplifier 25. The amplifier 25 is used simply as an inverter. During the positive half cycle, diode 22 is held open (i.e., non-conducting), no current flows through resistor 23 because the other side of resistor 23 is connected to a virtual ground at the summing junction 26 of amplifier 19, and since the voltage across resistor 23 is zero, no signal is applied to resistor 27. During the negative half cycle of $E_f$, the situation is reversed; diode 22 conducts and diode 20 is open so that full signal is applied to resistor 27 and no signal is applied to resistor 24. Operational amplifier 28 in conjunction with resistors 29, 30, 31, 32 and capacitors 33, 34, and 35, functions as a third order active filter, making the D.C. output voltage $E_o$ available from the low-impedance of a feedback amplifier. Resistor 36 provides for the addition of a harmonic correction voltage $E_h$(D.C.) when the output $E_o$ is desired to be r.m.s. rather than fundamental or simply average.

The circuitry enclosed within the block 37 of FIG. 3 corresponds to the square network 3 of FIG. 1. The correction term $E_{h(DC)}$ is required when an output proportional to the r.m.s. value of input voltage waveform is desired from converter 4. By closing switch 6, a signal voltage representing the term $E_{h(DC)}$ is applied to converter 4 and acts as a correction factor in the converter to cause the fundamental average determination to be converted into an R.M.S. determination. The network shown within block 37 is a preferred circuit, but it should be understood that other suitable square networks are known and may be substituted in block 37. A three-segment diode, approximating network is employed to perform the squaring function. Resistor 38 connects the anode of diode 39 to ground and the cathode of that diode is connected through a resistor 40 to the "stop" output of filter 11. A resistor 41 is connected in series with a diode 42, the serially connected resistor and diode shunting resistor 38. Similarly, the resistor 41 is shunted by a diode 43 in series with a resistor 44. The values of the resistors are chosen to satisfy an equation (16) which is derived below. The correction term $E_{h(DC)}$, required when an output proportional to r.m.s. is desired, may be conveniently generated as follows:

$$\text{Let } f(t)=E_h(t)=E_{h2}\cos(2w_o t+\phi_2)+E_{h3}\cos(3w_o t+\phi_3)+\ldots\ldots\ldots\ldots$$

Assuming a series resistance element R and a shunt (voltage sensitive) element $Z(g)$ where the output of the square network is $g(t)$ $$Z(g) \text{ for } e<0$$

is sought assuming $$Z(g)=\infty, \text{ for } e\geqq 0$$

such that $$\overline{g(t)}=k\frac{1}{T}\int_0^T[f(t)]^2dt=kf^2_{rms} \quad (3)$$

It follows that $$g(t)=f(t) \text{ for } f(t)\geqq 0 \text{ and no load} \quad (4)$$

and $$g(t)=A(g)f(t) \text{ for } f(t)\leqq 0 \quad (5)$$

assuming $A(g)$ is the voltage transfer operator of the R and $Z(g)$ network.

If $$f(t)\geqq 0 \text{ from } t=0 \text{ to } t=T/2 \quad (6a)$$

and $$f(t)\leqq 0 \text{ from } t=T/2 \text{ to } t=T \quad (6b)$$

then $$\overline{g(t)}=\frac{1}{T}\int_0^T g(t)=\frac{1}{T}\int_0^{T/2}f(t)dt+\frac{1}{T}\int_{T/2}^T A(g)f(t)dt \quad (7)$$

Now $$\frac{1}{T}\int_0^{T/2}f(t)dt\frac{1}{T}\int_{T/2}^T f(t)dt=0 \quad (8)$$

for $\overline{f(t)}=0$, which is a requirement.

Hence $$\overline{g(t)}=-\frac{1}{T}\int_{T/2}^T f(t)dt+1/T\int_{T/2}^T A(g)f(t)dt \quad (9a)$$

$$\overline{g(t)}=\frac{1}{T}\int_{T/2}^T[A(g)f(t)-f(t)]dt \quad (9b)$$

To satisfy (3), $$k1/T\int_0^T|f(t)|^2dt=\frac{1}{T}\int_{T/2}^T[A(g)f(t)-f(t)]dt \quad (10)$$

Now $$\frac{k}{T}\int_0^T|f(t)|^2dt=\frac{2k}{T}\int_{T/2}^T|f(t)|^2dt \quad (11)$$

The criterion is $$\frac{2k}{T}\int_{T/2}^T|f(t)|^2dt=\frac{1}{T}\int_{T/2}^T[A(g)f(t)-f(t)]dt \quad (12)$$

Assuming that $Z(g)$ is non-polarity reversing, we note that from T/2 to T, $f(t)<0$ from (6*b*); or in that interval, $f(t)\equiv-|f(t)|$; hence, we must have $$\frac{2k}{T}\int_{T/2}^T|F(t)|^2dt=\frac{1}{T}\int_{T/2}^T[|F(t)|-A(g)|f(t)|]dt \quad (13)$$

One means of satisfying 13 is for the integrands to be equal, or $$\frac{2k}{T}|f(t)|^2=\frac{1}{T}\{|f(t)|-A(g)|f(t)|\} \quad (14)$$

or we have $$A(g)|f(t)|=|f(t)|-2k|f(t)|^2 \quad (15)$$

The final expression employed uses $k=1/40$, or $$|g(t)|=|f(t)|-1/20|f(t)|^2 \quad (16)$$

The three-segment diode approximating network has an input-output characteristic which satisfies equation 16. Resistors 45 and 46 and capacitors 47 and 48 filter the resulting output to provide the required correction term $E_{h(DC)}$.

While a preferred embodiment of the invention is illustrated in the drawings and has been described herein, modifications which do not depart from the essence of the invention may be made and, indeed, are apparent to those knowledgeable in electronic circuitry. Therefore, it is intended that the invention not be limited by the precise structure which is illustrated, but rather that the scope of the invention be construed in accordance with the appended claims.

What is claimed is:

1. Apparatus for extracting the fundamental component from an input signal having a complex waveform while preserving the amplitude of said fundamental component comprising, a first high gain wide band amplifier having two degenerative feedback paths connected in parallel, a first band pass filter in one of said feedback paths having its band pass characteristic centered on the frequency of said fundamental component, a first band stop filter in the other of said feedback paths having its band rejection characteristic centered on said fundamental component, a second high gain wide band amplifier having two degenerative feedback paths connected in parallel, a second band pass filter and a second band stop filter having their respective pass and stop characteristics centered on the frequency of said fundamental component, said second band pass filter and second band stop filter being arranged in different feedback paths of said second amplifier, means connecting the output of said first band stop filter to the input of said second amplifier, a summing device, and means connecting the outputs of said first and second band pass filters to said summing device.

2. A system for converting an input signal having a complex waveform to a direct current signal proportional to the root means square value of said input signal comprising an operational filter for extracting the fundamental component of said complex waveform, said operational filter providing a first output which is essentially said fundamental component and a second output containing the harmonic components of said complex waveform, a full wave rectifier coupled to said first output, a square network coupled to said second output, said network providing a D.C. correction signal, means for filtering the output of said rectifier to provide a D.C. signal, and means for coupling said correction signal to said rectifier output filtering means.

3. A system for converting an input signal having a complex waveform to a direct current signal proportional to the root means square value of said input signal comprising an operational filter for extracting the fundamental component of said complex waveform, said operational filter including a cascade of high gain wide band amplifiers, each of said amplifiers having a pair of degenerative feedback paths connected in parallel, one of said feedback paths having a band pass filter whose band pass characteristic is centered on the frequency of said fundamental component, the other of said feedback paths having a band stop filter whose band stop characteristic is centered on the frequency of said fundamental component, said operational filter providing a first output which is essentially said fundamental component and a second output containing the harmonic components of said complex waveform, and an average to D.C. converter, having its input coupled to the first output of said operational filter.

4. The system according to claim 3, further comprised by a square network coupled to the second output of said operational filter, and network providing a D.C. correction signal, and means for applying said correction signal to said converter.

5. A system for converting an input signal having a complex waveform to a direct current signal proportional to the root mean square value of said input signal comprising an operational filter having a cascade of high gain wide band amplifiers, each of said amplifiers having a pair of degenerative feedback paths connected in parallel, one of said feedback paths incorporating a band pass filter whose band pass characteristic is centered on the frequency of the fundamental component of said complex waveform, the other of said feedback paths having a band stop filter whose band stop characteristic is centered on the frequency of said fundamental component, means connecting the output of each band stop filter to the input of the next amplifier in the cascade, a summing network, each of said band pass filters having its output connected to said summing network whereby the output of said summing network is essentially said fundamental component, a rectifier coupled to the output of said summing network, and means for filtering the output of said rectifier to provide a D.C. signal.

6. The system according to claim 5, further comprised by a squaring device, means coupling the output of the last band stop filter in said cascade to the input of said squaring device, a filter connected to the output of said squaring device for providing a D.C. correction signal, and means for coupling said correction signal to said rectifier output filtering means.

7. The system according to claim 6, in which said rectifier is comprised by a high gain amplifier having a pair of feedback paths, a first diode in one of said feedback paths arranged to permit current flow only during the positive excursion of an input signal, a second diode in the other of said feedback paths arranged to permit current flow only during the negative excursion of an input signal, a load impedance in each of said feedback paths, and means for deriving an output signal from across said load impedance of each path.

8. The system according to claim 5, further comprising a multiplier having its input connected to the output of the last band stop filter in said cascade, and means connecting the output of said multiplier to said summing network.

References Cited in the file of this patent

UNITED STATES PATENTS

| | | |
|---|---|---|
| 2,185,388 | Wheeler | Jan. 2, 1940 |
| 2,229,702 | Larsen | Jan. 28, 1941 |
| 2,584,386 | Hare | Feb. 5, 1952 |
| 2,659,776 | Nowak | Nov. 17, 1953 |
| 2,662,939 | Nowak | Dec. 15, 1953 |
| 2,752,433 | White et al. | June 26, 1956 |